US 9,779,530 B2

(12) United States Patent
Ranft et al.

(10) Patent No.: US 9,779,530 B2
(45) Date of Patent: Oct. 3, 2017

(54) METHOD FOR CREATING A MICROSCOPE IMAGE AND METHOD FOR OPERATING A MICROSCOPE

(71) Applicant: OLYMPUS SOFT IMAGING SOLUTIONS GMBH, Muenster (DE)

(72) Inventors: Alexander Ranft, Muenster (DE); Mathias Katzer, Altenberge (DE)

(73) Assignee: OLYMPUS SOFT IMAGING SOLUTIONS GMBH, Muenster (DE)

(*) Notice: Subject to any disclaimer, the term of this patent is extended or adjusted under 35 U.S.C. 154(b) by 0 days.

(21) Appl. No.: 15/004,357

(22) Filed: Jan. 22, 2016

(65) Prior Publication Data
US 2016/0140746 A1    May 19, 2016

Related U.S. Application Data

(63) Continuation of application No. PCT/EP2014/001865, filed on Jul. 7, 2014.

(30) Foreign Application Priority Data

Jul. 22, 2013 (DE) .................. 10 2013 214 318

(51) Int. Cl.
*G06K 9/48* (2006.01)
*G06T 11/60* (2006.01)
(Continued)

(52) U.S. Cl.
CPC ............ *G06T 11/60* (2013.01); *G02B 21/365* (2013.01); *G02B 21/367* (2013.01);
(Continued)

(58) Field of Classification Search
CPC .......... G06T 3/4038; G06T 2207/0042; G06T 2207/30101; G06T 2207/20212;
(Continued)

(56) References Cited

U.S. PATENT DOCUMENTS 4,673,988 A    6/1987 Jansson et al.
7,256,799 B2 *  8/2007 Hatanaka ............ G06T 3/4038
                                                    345/1.3
(Continued)

FOREIGN PATENT DOCUMENTS

DE    102006034996 A1    1/2008
JP      2000-165656 A     6/2000
(Continued)

OTHER PUBLICATIONS

International Search Report dated Sep. 22, 2014 issued in PCT/EP2014/001865.
(Continued)

*Primary Examiner* — Ali Bayat
(74) *Attorney, Agent, or Firm* — Scully, Scott, Murphy & Presser, P.C.

(57) ABSTRACT

A method for creating an overall image of an object from a plurality of recorded images that each depict a small area of the object, the method including: dividing the overall image into fields; assigning a part of the plurality of recorded images to each of the fields; and composing the plurality of recorded images into the overall image.

12 Claims, 3 Drawing Sheets

(51) Int. Cl.
G02B 21/36 (2006.01)
G06K 9/46 (2006.01)
G06K 9/52 (2006.01)
G06T 7/60 (2017.01)
G06T 7/73 (2017.01)
G06T 7/13 (2017.01)

(52) U.S. Cl.
CPC ............ *G06K 9/4604* (2013.01); *G06K 9/52* (2013.01); *G06T 7/13* (2017.01); *G06T 7/60* (2013.01); *G06T 7/73* (2017.01); *G06K 2009/4666* (2013.01); *G06T 2207/20212* (2013.01)

(58) Field of Classification Search
CPC ............ G06T 2207/0085; G06T 11/60; G06T 7/0026; G06T 7/0085; G06T 7/0042; G06T 7/60; G06K 9/4604; G06K 9/52; G06K 2009/466
See application file for complete search history.

(56) References Cited

U.S. PATENT DOCUMENTS

| | | | |
|---|---|---|---|
| 8,217,998 B2 | 7/2012 | Zoephel | |
| 9,147,250 B2* | 9/2015 | Liu | G01R 33/5608 |
| 2003/0076361 A1* | 4/2003 | Hatanaka | G06T 3/4038 |
| | | | 715/771 |
| 2008/0024600 A1 | 1/2008 | Zoephel | |
| 2009/0196526 A1 | 8/2009 | Schmid | |
| 2010/0086220 A1* | 4/2010 | Minear | G06T 7/0026 |
| | | | 382/218 |
| 2012/0237137 A1 | 9/2012 | Chen | |
| 2013/0072782 A1* | 3/2013 | Liu | G01R 33/5608 |
| | | | 600/410 |
| 2013/0083188 A1* | 4/2013 | Mian | B60T 17/228 |
| | | | 348/135 |

FOREIGN PATENT DOCUMENTS

| | | |
|---|---|---|
| JP | 2002-514319 A | 5/2002 |
| JP | 2003-196650 A | 7/2003 |
| JP | 2011-002341 A | 1/2011 |
| JP | 2011-076296 A | 4/2011 |

OTHER PUBLICATIONS

Kooper, R. et al., "Stitching giga pixel images using parallel computing", Parallel Processing for Imaging Applications, Proc. of SPIE—IS&T Electronic Imaging (2011), SPIE vol. 7872; retrieved from the internet, http://spieddigitallibrary.org on Apr. 4, 2014.

Japanese Office Action dated Jul. 25, 2017 in Japanese Patent Application No. 2016-528370.

* cited by examiner

METHOD FOR CREATING A MICROSCOPE IMAGE AND METHOD FOR OPERATING A MICROSCOPE

CROSS-REFERENCE TO RELATED APPLICATION

The present application is a continuation of PCT International Application No. PCT/EP2014/001865, filed on Jul. 7, 2014, which is based upon and claims the benefit of German Patent Application No. DE 10 2013 214 318.4, filed on Jul. 22, 2013. The entire content of PCT International Application No. PCT/EP2014/001865 and the entire content of German Patent Application No. DE 10 2013 214 318.4 are incorporated herein by reference.

BACKGROUND

Field

The present application relates to a method for creating an overall image of an object from a plurality of recorded images, such as digital recorded images, each depicting a small area of the object.

Description of Related Art

Particularly in microscopy and microscope image processing methods, the problem exists that the image to be created of an object or a sample such as a blood sample, in high resolution microscopic images is much larger than the area that can be recorded with a single image such as by a digital camera. A type of mosaic image with a high resolution accordingly results. The sample or the object of which the mosaic image is to be recorded is moved within a grid while being controlled by the imaging means, and individual images are recorded at previously calculated positions and are subsequently composed into a microscopic image. The result is that the individual images can be composed almost seamlessly. This is for example described in the document U.S. Pat. No. 4,673,988 A1.

Furthermore, to process a digital microscopic image, it is known to load the entire microscopic image into the main memory of the computer and then process the microscopic image by a processor of the computer. Reference is accordingly made to the document DE 10 2006 034 996 A1. Since however the entire microscopic image is too large to be loaded as a whole into the possibly virtual main memory of the computer, the microscopic image is partially transferred to the mass memory. This is termed "swapping" or "paging". For the computing operations to be executable, the parts of the image must be reloaded into the main memory which takes time.

When the microscopic image is so large that it cannot be completely retained within the main memory, fields are processed individually in the known method with the consequence that either information on the neighbouring fields is not included and imprecisions arise at the edge, or specific algorithms must be developed to solve this problem of the imprecisions. Frequently, these imprecisions are also merely accepted. Special algorithms must then be found to solve the problem of precision at the edge. The document DE 10 2006 034 996 A1 solves this problem by presenting a microscopic image processing method for execution on a computer, wherein the computer has a main memory with a predetermined available memory capacity and a mass memory that possesses longer access time that the main memory, wherein to process a digital microscopic image that consists of pixels, is n-dimensional with n>1, consists of at least two fields and possesses a size which exceeds the available memory capacity of the main memory, wherein a computing operation is used for at least part of a microscopic image comprising the following steps:

a) provision of the microscopic image in the mass memory
b) division of the microscopic image into at least two sections which can be loaded into the main memory and possesses a dimension m, wherein m≤n,
c) for one section of the image, determination of all the pixels that lie in the section of the image and in at least one of the fields to produce a filled image section,
d) provision of the filled section of the image in the main memory,
e) using the computing operation for the pixels lying in the filled image section to produce an image section result,
f) repeating steps c), d) and e) for all image sections, and
g) joining all of the image section results into an overall result.

However, this patent application is entirely silent about the creation of an overall image of an object, i.e., such as a microscopic image.

Furthermore when positioning the object relative to the microscope lens system by means of which the fields are recorded, deviations in precision can occur, and the precisely exact position therefore cannot be approached. Furthermore, imaging errors can occur in the edge area of the recorded fields which are composed into an overall image, i.e., the complete microscopic image, which arise from optical effects on the lenses of the microscope lens system.

SUMMARY

The object is to provide an efficient method for creating an overall image of an object from a plurality of in particular digital recorded images by means of which very precise overall images can be created, wherein in particular positioning errors and/or optical errors from imaging the plurality of the recorded images can be compensated when creating the overall image.

This object is achieved with a method for creating an overall image of an object from a plurality of in particular digital recorded images that each form a small area of the object which is further processed in that the overall image is or will be divided into fields, wherein each field of the overall image is or will be assigned a part of the plurality of recorded images, wherein the recorded images are composed into the overall image such that the recorded images of one field are first recorded and composed, and then another field consisting of recorded images that are recorded is composed.

A very precise overall image of an object or a sample is recorded very efficiently by means of the method disclosed in the subject application. For this purpose, a plurality of in particular digital recorded images are taken sequentially which belong to a field and are precisely composed. By dividing the overall image into fields, the fields can be recorded in a very short time, i.e., very rapidly, so that very sharp images can be achieved since, for example, thermal drift of the focus is irrelevant given the speed at which the fields are created. The steps of the method can be executed for all fields, or relevant fields, to obtain the overall image.

In addition, mechanical positioning errors of a positioning device of the microscope are optimally compensated. In this regard, the positioning device serves for example to move the sample or the object in a grid-like manner to enable the plurality of in particular digital recorded images of different locations of the object. This allows the overall object to be surveyed or recorded while compensating for positioning imprecision of the positioning device.

A particularly precise overall image and field are achieved when, to compose the recorded images into a field, at least two edges of the respective recorded image overlap respectively with at least one edge of at least two recorded images adjacent to the recorded image. Accordingly, the recorded images can be placed precisely next to each other, and mechanical positioning imprecisions can be efficiently compensated.

With this type of composition, problems can, however, arise. These problems can for example occur when, while composing the recorded images, an arrangement or a composition is made with the adjacent recorded image to the right, for example, from a recorded image arranged at the top left. Correspondingly, when composing the image on the left arranged below the top left recorded image, the adaptation of the recorded image lying below the top right recorded image may not be harmonized with the adaptation or composition of the bottom left recorded image.

For this reason, in correlating the overlapping image areas of the recorded images with each other, the correlation can be weighted for the relative position of the neighbouring recorded images to each other. A normalized cross-correlation of the overlapping image areas is accordingly performed. In this context, it is in particular preferably normalized for image intensity.

In the correlation, the following can be carried out: In the correlation, an attempt is made to superimpose the positions of maximum correlation. This is also termed image registration or template matching. To accomplish this, the overlapping area of the recorded image pair to be correlated can undergo a quadratic division of the overlapping area into overlapping sub-areas. The overlapping sub-areas are processed sorted according to contrast. The areas having the greatest contrast are preferred. An image registration is calculated with normalized cross-correlations to the overlapping sub-areas until at least two overlapping sub-areas are processed and a minimum value of the correlation has been found. The minimum value can be specified in this context. The positions of maximum correlation from the registrations of the overlapping sub-areas are weighted and averaged with the square of the associated correlation value.

In this context, each overlapping sub-area to be registered is broken down into a pattern and a shifting edge. The so-called pattern is taken from an overlapping sub-area of the image of the two recorded images which was recorded earlier. From the other recorded image, the normalized cross-correlation with the pattern is calculated at each possible shifted position in the overlapping sub-area at that location. The result is the shifted position with the maximum correlation value.

The width of the shifting edge or the overlapping area can cover the positioning error of the microscope stage and can depend on the magnification of the microscope.

The roles of the two recorded images can be exchanged for the pattern and the shift search area or the shifting edge, and the process of cross-correlation is repeated. This can further increase the precision and robustness of the system and algorithm in terms of pattern recognition.

For the subsequent procedure, the shift positions between the overlapping sub-areas can be determined for all recorded images of a field, and the adjacent fields as well, providing they are needed for the joining together of the newly recorded field, and an origin of a recorded image recorded at a later time is calculated in the recorded image recorded at an earlier time.

All the recorded images of a field can be joined at the same time, i.e., the correlation and a weighting of the correlation are performed for all recorded images of a field. This reduces the overall composition error when joining recorded images of a field. The procedure for weighting the correlation can involve giving more weight to edge areas or overlapping areas of the recorded images that have more contrast. In this context, in particular area contrast is relevant, i.e., more contrast over a large area that can be specified. An example of how the cross-correlation is performed is described in the examples of the figures.

The recorded images can be rectangular, especially square, and have $2^n \times 2^m$ pixels, wherein n and m are preferably $\geq 9$. The fields can also be selected to be rectangular, in particular square, and can comprise several thousand recorded images. The fields can be compact, i.e., have side lengths that are as similar in length as possible, and/or neighbour compact sections.

The size of the fields can be adapted to the size of memory (RAM) directly accessible by a processor. A memory directly accessible to the processor is the main memory of a computer. How to precisely adapt the size in an example will also be further described with reference to the description of figures.

First the overall image of an object can be scanned before recording recorded images in order to determine where an object or a sample is located. The overall image is then divided into fields over the object or sample such that the entire object can preferably be surveyed or recorded. Different size fields can also be employed if useful. The fields can however be all the same size. The fields can also be larger when the samples or objects have a correspondingly special shape, for example when only a small part of the field is covered by an object. The background then for example either does not have to be recorded or saved. In this case, only the recorded images are taken that include at least part of the object.

The recorded images can be taken sequentially such that recorded images are made which are adjacent to each other, wherein in the process, the contour of the object or sample is captured at least in the field. This ensures in particular that no artefacts or major composition errors arise when composing the recorded images. This keeps the sample area in the arising overall picture or partial picture compact. Registration errors hence remain small since long, thin chains of individual images or recorded images are avoided. In addition, the required memory for the image edge is less than with a fragmented structure of partial areas or fields.

The part of the recorded images which is not needed to compose the recorded images into a field can be compressed and then saved. The compressed saving can occur in the main memory but can however also for example be assigned to a hard disk which is slower than the main memory.

After joining the recorded images into a field, the field can be saved, in particular compressed, in another memory such as a hard disk, except for the edges of recorded images that are needed for being joined to another field.

Overlapping image areas of recorded images arranged in adjacent fields can be correlated with each other to compose fields, wherein the correlation is weighted for the relative position of the adjacent fields. In this case, a greater correlation is weighted more heavily than a smaller correlation. A cross-correlation can be used in this case as well which is normalized for image intensity.

The fields can on the one hand be composed together in such a manner that the fields to be composed are first composed in the just recorded images, and then the fields only have to be oriented relative to each other or, when composing an already-composed field with another field, the recorded images of the other field are composed with the already composed field during composition. This minimizes composition errors.

A sequence of creating and composing the fields from recorded images can be determined automatically. The contour or area distribution of the object or the sample is accordingly determined first, and the sequence for creating fields is established using this contour. Preferably, a criterion for the sequence is the manifestation or presence of an object within a section, the coverage or overlap of the section area with an object, the number of created and composed adjacent fields and/or the number of recorded images of an adjacent field available to be joined with the field.

For example, a field can be placed higher in the sequence of creating and composing from recorded images when the overlapping area of the field with an object is comparatively large. Correspondingly, a field is placed higher in the sequence when the number of created and composed adjacent fields is high. Furthermore, a field is placed higher in the sequence when an object is in the field. When there is no object or only a small area of the object in the field, this field is moved to the rear of the sequence. Furthermore, a field is moved up in the sequence when the number of recorded images of an adjacent field which is available to be joined to the field is large. When for example there are already three adjacent fields that are required to be joined with the field to be created, this field is moved far forward in the sequence for creation. The depicted versions of a possible sequence for creating and composing fields are examples. A number of criteria which are noted above can be used, or only one criterion can be used. All of the criteria can be used as well, and a corresponding assessment or weighting function can be crafted. The respective criteria can be weighted differently.

For example, a first field in which recorded images are to be made and which is composed of the recorded images has the largest area covered by the object, and/or a first field has the greatest total contrast over the area of the field. This ensures that a part of the object that is to be recorded, or from which an overall image is to be created, starts if possible with the field which is the most distinctive for the sample.

A focus for one field can be determined before recording the recorded images of the field. This allows in particular thermal shifts in the focus or foci to be avoided. If the creation and composition of the respective field is fast enough so that drift in the focus or foci from thermal effects does not have to be feared, the focus or foci of two or more fields can also be determined before recording the recorded images of the fields.

The focus can be determined at several reference points, and an interpolation is performed between the reference points. For this purpose, triangular areas for example are created between the reference points with respect to the height contour. This is termed a triangulation, or a method according to Delaunay is used.

In another embodiment, a method for operating a microscope is provided. The method for operating the microscope comprises a method for creating an overall image as described in the subject application.

In the method for operating a microscope, to create an overall image of an object from a plurality of in particular digital recorded images that each depict a small area of the object, the overall image is or will preferably be divided into fields, wherein each field of the overall image is or will be assigned a part of the plurality of recorded images, wherein the recorded images are composed into the overall image such that the recorded images of one field are first recorded and composed, and then another field consisting of recorded images that are recorded is composed.

A positioning device can move the object under a lens system of the microscope to record the recorded images so that a recorded image can be recorded at a specified location of the object. For the next recorded image, the positioning device moves slightly so that the image of another location on the object can be recorded, etc. The recorded images of the recorded locations, or images of the locations, can overlap with each other so that the recorded images can be efficiently joined into a field, and the fields can be subsequently joined. In view of the method for creating an overall image of an object from a plurality of recorded images, in particular digital recorded images that each depict a small area of the object, reference is made to the entirety of that which was stated above.

In another embodiment, a computer-readable storage device is provided. The computer-readable storage device stores instructions such as program code which when executed by a computer causes the computer to execute the method for creating an overall image as disclosed in the subject application.

In another embodiment, a microscope is provided. The microscope comprises a computer system configured to execute the method for creating an overall image as disclosed in the subject application. Further features of the invention will become apparent from the description of embodiments according to the invention together with the claims and the included drawings. Embodiments according to the invention can fulfil individual characteristics or a combination of several characteristics.

BRIEF DESCRIPTION OF THE DRAWINGS

Embodiments of the invention will be described below without restricting the general inventive idea with reference to the drawings. For any details which are not explained further in the written description, express reference is made to the drawings.

In the drawings.

In the drawings, the same or similar elements and/or parts are provided with the same reference numbers in order to prevent the item from needing to be reintroduced.

DETAILED DESCRIPTION

Figure 1:
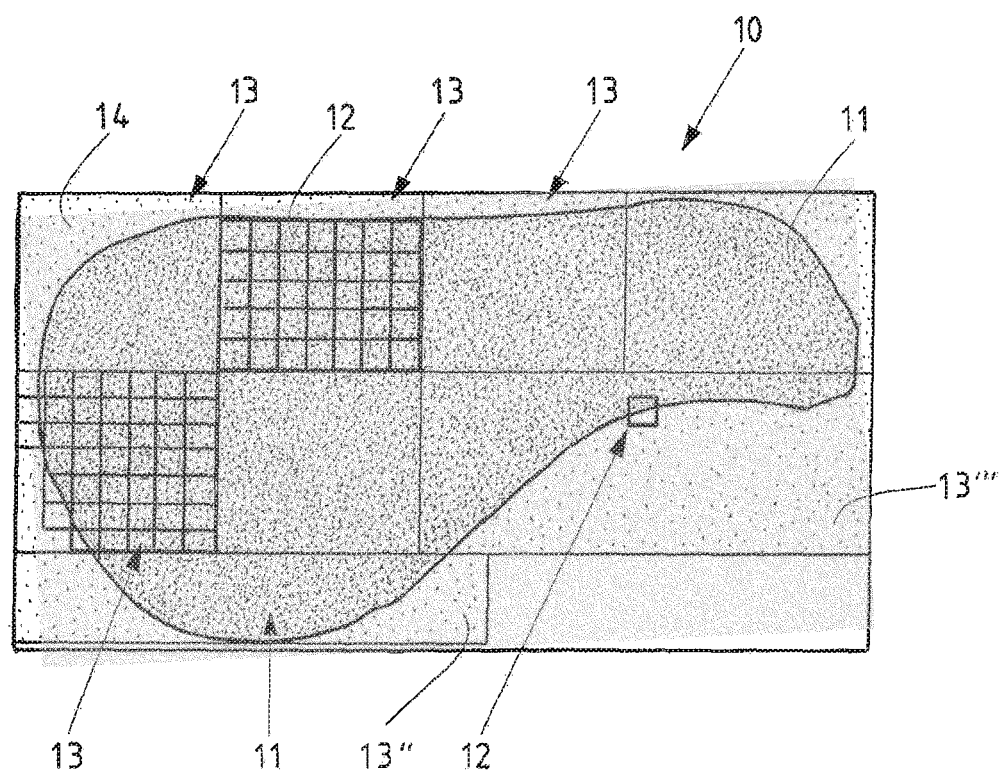
FIG. 1 shows a schematic plan view of an overall image of an object with fields.

FIG. 1 shows a schematic plan view of an object 11 that is placed on an object slide, from which a microscopic image is to be created as an overall image 10. The object 11 can for example be a tissue sample from a human or animal, or a plant sample. In order to make a microscopic image, a thin layer of the sample is placed on a glass slide and placed in a microscope in order to create an overall image therein.

In the procedure, the contour of the object 11 for the overall image is first detected, and then an area is identified from which the recorded images are to be made. For this purpose, the overall image is divided into fields 13 which can depict parts of the object 11. Then digital recorded images 12 in the respective fields are recorded and, as described below, are combined to create a field consisting of a plurality of digital recorded images.

The field 13 second from the top viewed from the left side in FIG. 1 schematically depicts 35 recorded images that were made of the sample or object 11, wherein this number of recorded images is only cited as an example. In fact, there can be several thousand recorded images per field. The size of the fields, i.e., the number of recorded images per field, substantially depends on the available amount of memory, or the available main memory for the processor executing the image processing and joining the digital recorded images into a field 13. A good example of corresponding sizes will also be addressed below.

It is unnecessary to make recorded images of just the background 14 since this is fully irrelevant to the object 11 itself. For this reason, the field 13' is not completely filled with recorded images. As can be seen in FIG. 1, not all of the fields have the same dimensions. The size of the fields 13-13''' substantially depends on the area of the digital recorded images to be taken and hence on the amount of data. The two fields 13" and 13''' that are displayed slightly elongated take up comparably little area of the object so that only part of the field 13" and 13''' must be provided with corresponding recorded images.

Figure 2:
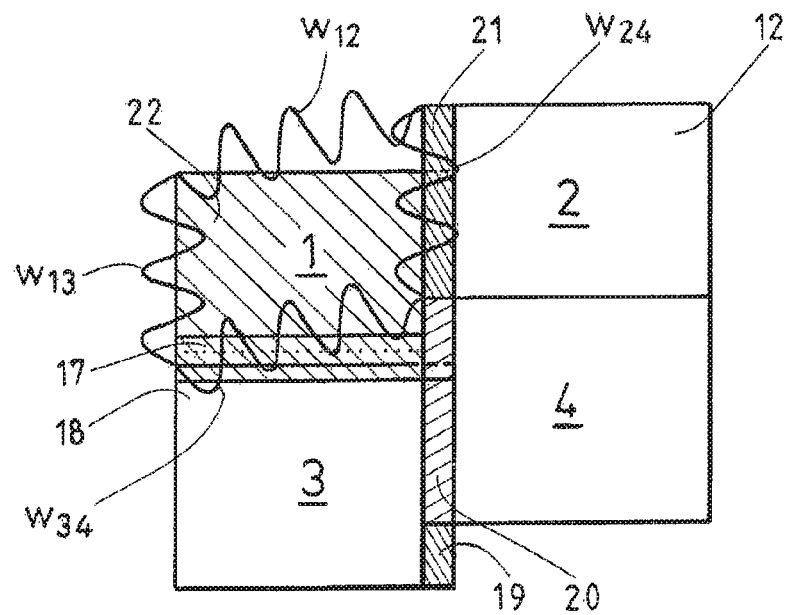
FIG. 2 shows a schematic representation to explain the creation of a field.

With reference to FIG. 2, an example will be explained of the composition of digital recorded images into a field. For the sake of simplicity, it will be assumed that four digital recorded images 1-4 are in the field depicted in FIG. 2. These four digital recorded images are provided with reference numbers 1, 2, 3 and 4. The recorded images have corresponding edges which are put together to compose or join the recorded images like a mosaic, or like stacked tiles. The recorded image 1 has a bottom edge 17, recorded image 3 has an edge 18, recorded image 2 has an edge 21, recorded image 3 has another edge 19, and recorded image 4 has an edge 20. The recorded image 1 also has a corresponding edge on the right side which however is completely covered. The overlapping edges of the recorded images 2 and 4 are not depicted.

FIG. 2 also shows, in a highly schematised manner, how the recorded images are composed. Springs between the points of origin of the recorded images, i.e., in this example the top, left corners of each recorded image, are schematically portrayed and identified with $\omega_{ij}$, wherein "i" is the number of the recorded image from which the spring begins, and "j" is the number of the recorded image at which the spring ends. Something of an analogy to Hooks law is provided with the depiction of a spring. In the process of joining pairs of recorded images, the spring energy corresponds to the shift of the positions of images relative to each other from the positions anticipated by mechanics in square. In this context, it is assumed first off that the drive of the sample table or microscope is rather precise, and the sample 11 is moved in steps relative to the microscope lens so that relatively precisely positioned recorded images are made with specifiable overlaps of the sample. Due to mechanical imprecisions, the recorded images are then joined as provided according to the disclosure of the subject application.

In the approach for joining the recorded images, areas with high contrast are sought at the edges 17 to 21. A normalized cross-correlation is performed, in particular a cross-correlation normalized for image intensity. The areas with greater contrast are weighted higher for combining than areas with less contrast. An attempt is made to superimpose the images at the edge areas with maximum coincidence so that the same structures overlap. Overall, a minimum function is calculated based on a mathematical model of the values, according to the following formula:

$$\min_{\{A\}} \sum_{i,j \in Adjacent pairs} w_{ij}^2 \|\vec{a}_j - \vec{a}_i - \vec{s}_{ij}\|^2$$

In this context, "A" is the number of all recorded images, "a" is the origin of each recorded image, "s" are the displacement vectors, i.e. the displacement (i.e., the change in coordinates from the starting position of the recorded images) of the respective recorded images due to the performed cross correlation, and "w" is the weighting factor of the respective cross-correlation. This yields optimum positioning of all the recorded images of a field. The adjacent pairs are the neighbouring recorded images for which the cross-correlation is performed.

Figure 3:
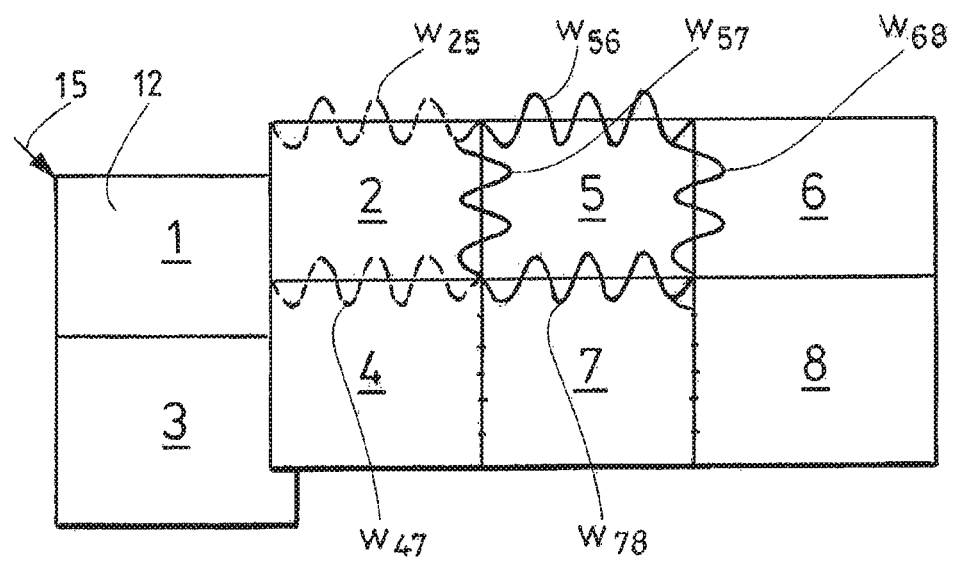
FIG. 3 shows a schematic representation to explain the combination of the second field with a first field.

FIG. 3 shows how another field is joined together and joined to a first field. 15 indicates the origin of the first field comprising recorded images 1, 2, 3, and 4. Reference number 15 can also be designated $a_1$ when the above formula is used. The second field comprises the recorded images 5, 6, 7 and 8. The second field comprising recorded images 5, 6, 7 and 8 is correspondingly joined together based on the strength of the respective cross-correlation which is depicted or indicated by the springs $w_{56}$, $w_{57}$, $w_{68}$ and $w_{78}$. At the same time, the right edge of the recorded image 2 and recorded image 4 are correlated with the left edge of the recorded image 5 and recorded image 7 as depicted by the schematically represented springs $W_{25}$ and $w_{47}$. The optimum joining result is thereby achieved even at the transition from one field to the next field.

The corresponding approach is then used for fields as well which have even more joined-together fields surrounding them.

At the conclusion, the method according to the disclosures of the subject application provides an optimum composition matrix, or an optimum placement matrix, of the recorded images which display minimal inaccuracy in joining.

By using fields, the imaging time is reduced sufficiently so that thermal drift of the focus no longer constitute a problem. In addition, the alignment of the images, i.e., all recorded images of all the fields, is optimized before the recorded images are inserted into the resulting overall image. Furthermore, the x,y coordinates of three-dimensional space are on the surface of the object slide.

The recorded images can be configured such that adjacent recorded images are always sequentially recorded. Further, fields can be configured such that adjacent fields are produced. This minimizes artefacts when joining. In addition, the edge areas of the recorded images which are still required to join recorded images or fields are to be saved without being compressed to thereby also prevent artefacts.

Figure 4:
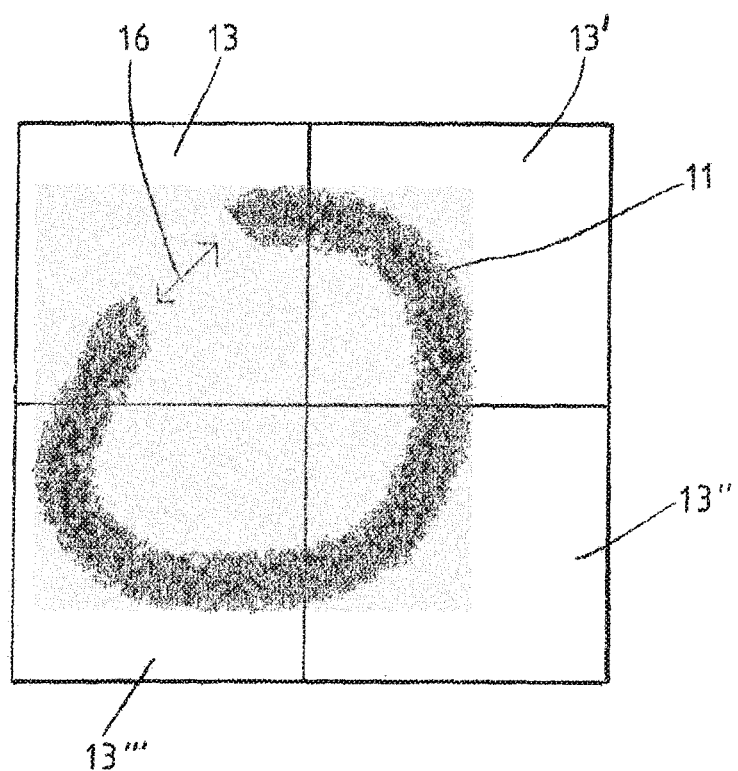
FIG. 4 shows a schematic plan view of an overall image with four fields.

FIG. 4 shows a schematic plan view of a sample or an object 11, and serves to clarify the determination of the sequence of fields to be recorded.

The sample 11 in the field 13 has a gap 16. If this field 13 were to be used for starting, difficulties would arise in joining the field 13" to field 13' and field 13'''. For this reason, an appropriate sequence must be determined. For this purpose, as much amount of the sample or object as possible should initially be in the field used for starting. Field 13''' is eligible since the largest area coverage or overlap of the sample prevails therein, and furthermore the contrast is at least as great as in fields 13'' and 13'. The method therefore automatically starts with field 13'''.

Once all of the necessary recorded images of the field 13''' are produced and composed, the running algorithm continues to check the amount of sample areas prevailing in the fields. It appears that field 13'' has slightly more sample area than field 13, but less than field 13'. The algorithm for determining the sequence can be programmed to prefer fields whose adjacent images are already finished. Accordingly, field 13'' would have preference. In addition, the algorithm can also provide that fields which have samples with complete interruptions of the sample should be created as late as possible and be placed to the rear of the sequence. In this exemplary embodiment, field 13'' would therefore be the next in line. Since there is more sample material in field 13' and an adjacent field has already been produced for both fields, field 13' is produced as the next field.

The number of recorded images adjacent to the field which are used for joining can also be evaluated as another algorithmic component for determining the sequence to create the field. The more recorded images which can serve for joining, the farther the field is advanced to the front of the sequence.

It was already mentioned above that before the recorded images are recorded, the object or sample is scanned for the sake of autofocusing. Since the objects have different heights or do not have the same thickness at each site or are wavy, the focus must be adjusted differently at different positions of the object. For this reason, it is useful to set a focus at a number of reference points. This can be done in only one field or only a few fields to counteract thermal drift. In executing an automatic focus, the system moves the object or object slide under the camera so that the focus can be correspondingly determined at the reference points. To reduce the time for this, the system or the algorithm checks whether corresponding focal points have already been determined, for example by checking if the focus or foci have already been determined in an adjacent field. The corresponding focus can then be used as long as its recording time had occurred within a specifiable period, i.e., not too long ago.

Interpolation is then carried out between the positions at which the focus was determined. For example, a triangle is drawn between three focal points which lies at an angle in space corresponding to the focal height. This method approximately corresponds to the Delaunay method.

In the employed procedure, triangulation is performed which provides a seamless and non-overlapping number of triangles, wherein the triangles lie between the specified reference points. This ensures that the planar interpolation is functional and unambiguous at each location of the sample surface. A focus can thereby be determined at each location of the sample surface.

Previously determined focal values of adjacent fields can however only be accessed if a predetermined time has not passed from the moment at which the focus is determined until this focal value is used. This can for example be 10 minutes. Thermal drift is thereby prevented.

In the context of the disclosures of the subject application, the term "compose" also includes arranging recorded images next to each other, or fields relative to each other, or a matching, or arrangement, or adaptation, or alignment relative to each other. Instead of "compose", the term "register" can also be used. The edges of the recorded images are accordingly registered, or an image registration of the edges of the recorded images that overlap with each other is performed.

In the event that a field or the recorded images of the field are aligned relative to each other, all the recorded images for the entire field are saved in a cache memory. In this context, all of the recorded images as well as the edges of the recorded images that are no longer being used for joining with other recorded images can be compressed. The edge areas of the recorded images which are still required for joining with other recorded images of adjacent fields are saved separately without being compressed, or can be saved separately without being compressed.

Depending on the size of the required memory, the fields are adapted to the main memory of the computer system belonging to the microscope. Further, the size of the field can be selected such that all recorded images of two fields fit within the main memory. This makes it possible to record additional recorded images of an additional field while joining a field to a previously assembled field. In addition, a certain section of memory or a certain amount of memory of the main memory (RAM) can be provided to be kept free for other tasks, such as within a range of 1 to 5 GB and preferably 3 GB.

Embodiments according to the invention can be realised by individual features, or a combination of several features. In the scope of the invention, characteristics which are designated with "in particular" or "preferably" are understood to be optional features.

LIST OF REFERENCE SIGNS

1-8 Recorded image
10 Overall image
11 Object/sample
12 Recorded image
13-13''' Field
14 Background
15 Point of origin
16 Gap
17-21 Edge
22 Part of the recorded image without an edge
$W_{ij}$ Weighting value
i,j Number of the recorded image

What is claimed is:

1. A method for creating an overall image of an object from a plurality of recorded images that each depict a small area of the object, the method comprising:
   dividing the overall image into fields;
   assigning a part of the plurality of recorded images to each of the fields of the overall image; and
   composing the plurality of recorded images into the overall image,
      wherein the part of the plurality of the recorded images of a first field is first recorded and composed, and then the part of the plurality of recorded images of a second field is recorded and composed, and
      wherein composing the part of the plurality of the recorded images of the first field comprises:
         seeking at least two edges of a first recorded image that overlap respectively with an edge of a second recorded image adjacent to the first recorded image and an edge of a third recorded image adjacent to the first recorded image; and
         performing a correlation of the overlapping edges of the first to third recorded images, wherein the correlation is weighted for the relative position of neighboring recorded images to each other.

2. The method according to claim 1, wherein in dividing the overall image into fields, the size of the fields is adapted to the size of a first memory accessible to a processor.

3. The method according to claim 2, further comprising: compressing and saving one or more of the plurality of recorded images not assigned to the field.

4. The method according to claim 2, further comprising: after composing the first field and the second field, parts of the first field and the second field except for edges of recorded images needed for being joined to other fields are saved in a second memory.

5. The method according to claim 1,
wherein composing the fields into the overall image comprises:
   performing correlation of overlapping image areas of recorded images arranged in adjacent fields with each other, wherein the correlation is weighted for the relative position of the adjacent fields.

6. The method according to claim 1,
wherein a sequence of composing the first field and composing the second field is determined automatically based on one or more criterions.

7. The method according to claim 6,
wherein the one or more criterions comprise:
   the manifestation of the object within a section;
   the area overlap of the section with the object;
   the number of created and composed adjacent fields; and
   the number of recorded images of an adjacent field that is/are available to be joined with the field.

8. The method according to claim 6
wherein in the sequence of composing the first field and composing the second field, the first field is selected to be composed before the second field based on one or more of:
   the first field having the largest area covered by the object, and
   the first field having the greatest total contrast over the area of the first field.

9. The method according to claim 1, further comprising: determining a focus for one field before recording the recorded images of the one field.

10. The method according to claim 9,
wherein the focus is determined at a plurality of reference points, and
wherein the method further comprises:
   performing an interpolation between the plurality of reference points.

11. The method according to claim 1, further comprising: operating a microscope to acquire the plurality of recorded images.

12. A non-transitory computer-readable storage device storing instructions that when executed by a computer causes the computer to execute the method according to claim 1.

* * * * *